United States Patent [19]

Renner et al.

[11] Patent Number: 5,525,685
[45] Date of Patent: Jun. 11, 1996

[54] EPOXY RESIN COMPOSITIONS

[75] Inventors: Alfred Renner, Muntelier; Jacques-Alain Cotting, Bonnefontaine, both of Switzerland

[73] Assignee: Ciba-Geigy Corporation, Tarrytown, N.Y.

[21] Appl. No.: 706,683

[22] Filed: May 29, 1991

[30] Foreign Application Priority Data

Jun. 5, 1990 [CH] Switzerland .............. 1878/90

[51] Int. Cl.$^6$ .............. C08L 61/24; C08L 61/28; C08L 63/08; C08L 63/02
[52] U.S. Cl. .............. 525/510; 525/406; 525/414; 525/161
[58] Field of Search .............. 525/510, 406, 525/414, 161

[56] References Cited

U.S. PATENT DOCUMENTS

| | | | |
|---|---|---|---|
| 3,274,026 | 9/1966 | Nyquist | 117/138.8 |
| 3,943,080 | 3/1976 | Wismer et al. | 260/20 |
| 4,401,776 | 8/1983 | Munk | 523/443 |
| 4,458,029 | 7/1984 | Munk | 502/171 |
| 4,458,051 | 7/1984 | Munk | 524/779 |
| 4,525,497 | 6/1985 | Kobayashi et al. | 523/427 |
| 4,931,491 | 6/1990 | Savin | 523/443 |

FOREIGN PATENT DOCUMENTS

| | | |
|---|---|---|
| 152575 | 8/1985 | European Pat. Off. . |
| 1569326 | 6/1969 | Germany . |

OTHER PUBLICATIONS

Makromol. Chem. vol. 120, 68 (Jul. 1968) no translation.
Makromol. Chem. vol. 149, 1 (Jan. 1971) no translation.
Chemical Abstract 103:217012k Nov. 1985.
Makromolekulare Chemie, vol. 120 p. 68 Jul. 1968.

*Primary Examiner*—W. Robinson H. Clark
*Attorney, Agent, or Firm*—JoAnn Villamizar; Luther A. R. Hall; Michele A. Kovaleski

[57] ABSTRACT

Free-flowing powdery compositions comprising: (A) liquid or semi-solid epoxy resins; and (B) solid colloidal condensation polymers of urea or melamine and formaldehyde having a pore volume greater than 1 cm$^3$/g and a specific surface area greater than 5 m$^2$/g. The novel compositions can be typically used as powder coating compositions, adhesives, casting resins and molding compounds.

7 Claims, No Drawings

EPOXY RESIN COMPOSITIONS

The present invention relates to compositions comprising epoxy resins and solid colloidal condensation polymers of urea or melamine and formaldehyde, to a process for the preparation of cured products which comprises the use of said compositions, and to the use of said compositions.

Epoxy resin compositions are well known for a wide variety of applications and technologies to those skilled in the epoxy resin art. However, for specific utilities, for example in powder coating and compression moulding technology, the use of liquid epoxy resins is not possible or entails considerable difficulties. There has consequently been no lack of attempts to obtain liquid epoxy resins in solid form. For example, in EP patent 38 292 liquid epoxy resins are converted into flowable mixtures with the aid of mineral fillers. However, the consistency of these mixtures does not meet the stringent requirements made of them in all respects, as the materials are normally obtained in crumb form. Moreover, these materials are very heavy owing to the high proportion of fillers.

Solid colloidal condensation polymers of urea or melamine and formaldehyde are known to those skilled in the art from, for example, Makromol. Chem. 120, 68 (1968) and from Makromol. Chem. 149, 1 (1971). These condensation polymers find utility, for example, as white pigments for paper manufacture and as reinforcing agents for elastomers. Further, the polymers are suitable for wastewater purification and for use in agricultural chemistry.

It has now been found that liquid and semi-solid epoxy resins can be converted into free-flowing, non-aggregating powders with the aid of colloidal condensation polymers of urea or melamine and formaldehyde.

Accordingly, the invention relates to free-flowing powdery compositions comprising
A) liquid or semi-solid epoxy resins and
B) solid colloidal condensation polymers of urea or melamine and formaldehyde having a pore volume greater than 1 cm$^3$/g and a specific surface area greater than 5 m$^2$/g.

Preferred epoxy resins have a softening point below 40° C.

The liquid and semi-solid epoxy resins used in the compositions of this invention are compounds which contain on average more than 1,2-epoxide groups in the molecule. The expression "liquid or semi-solid epoxy resin" is known per se to those skilled in the epoxy resin art.

Such epoxy resins may have an aliphatic, aromatic, cycloaliphatic, araliphatic or heterocyclic structure. They contain epoxy groups as side groups, or these groups form part of an alicyclic or heterocyclic ring system. The epoxy groups are preferably linked as glycidyl groups to the remainder of the molecule through ether or ester bonds, or the epoxy resins are N-glycidyl derivatives of heterocyclic amines, amides or imides. Epoxy resins of these types are commonly known and commercially available.

Preferred epoxy resins contain at least two radicals of formula I

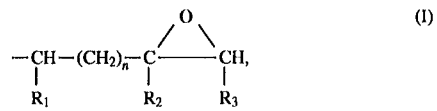

which radicals are attached direct to oxygen, nitrogen or sulfur atoms, wherein $R_1$ and $R_3$ are both hydrogen, $R_2$ is hydrogen or methyl and n=0, or wherein $R_1$ and $R_3$, when taken together, are —CH$_2$—CH$_2$— or —CH$_2$—CH$_2$—CH$_2$—, in which case $R_2$ is hydrogen and n=0 or 1.

Illustrative examples of this type of epoxy resin are:

I) Polyglycidyl and poly(β-methylglycidyl) esters which are obtainable by reacting a compound containing at least two carboxyl groups in the molecule and epichlorohydrin or glycerol dichlorohydrin or β-methyl epichlorohydrin. The reaction is conveniently carried out in the presence of a base.

Compounds containing at least two carboxyl groups in the molecule may suitably be aliphatic polycarboxylic acids. Exemplary of these polycarboxylic acids are glutaric acid, adipic acid, pimelic acid, suberic acid, azelaic acid, sebacic acid or dimerised or trimerised linoleic acid.

Cycloaliphatische polycarboxylic acids may also be used, for example tetrahydrophthalic acid, 4-methyltetrahydrophthalic acid, hexahydrophthalic acid or 4-methylhexahydrophthalic acid.

Aromatic polycarboxylic acids may also be used, for example phthalic acid, isophthalic acid, trimellitic acid or pyromellitic acid.

Carboxyl-terminated adducts can also be used, for example of trimellitic acid and polyols, typically glycerol or 2,2-bis(4-hydroxycyclohexyl)propane.

II) Polyglycidyl or poly(β-methylglycidyl) ethers which are obtainable by reacting a compound containing at least two free alcoholic hydroxyl groups and/or phenolic hydroxyl groups in the molecule with a suitably substituted epichlorohydrin, under alkaline conditions or in the presence of an acid catalyst and subsequent treatment with an alkali.

Ethers of this type are derived from, for example, acyclic alcohols such as ethylene glycol, diethylene glycol and higher poly(oxyethylene) glycols, 1,2-propanediol, or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, bis(trimethylol)propane, pentaerythritol, sorbitol, as well as from polyepichlorohydrins.

They are also derived, for example, from alcohols such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they contain aromatic nuclei, such as N,N-bis(2-hydroxyethyl)aniline or p,p'-bis(2-hydroxyethylamino)diphenylmethane.

The epoxy compounds may also be derived from mononuclear phenols such as resorcinol or hydroquinone, or they are based on polynuclear phenols such as bis(4-hydroxyphenyl)methane, 2,2-bis(4-hydroxyphenyl)propane, 2,2-bis(3,5-dibromo-4-hydroxyphenyl)propane or condensates of phenols with formaldehyde which are obtained under acid conditions, for example phenol novolaks.

III) Poly(N-glycidyl) compounds are obtainable, for example, by dehydrochlorination of the reaction products of epichlorohydrin with amines which contain at least two amino hydrogen atoms. These amines are typically aniline, toluidine, n-butylamine, bis(4-aminophenyl)methane, m-xylylenediamine or bis(4-methylaminophenyl)methane.

The poly(N-glycidyl) compounds, however, also include N,N'-diglycidyl derivatives of cycloalkylene ureas such as ethyleneurea or 1,3-popyleneurea and N,N'-diglycidyl derivatives of hydantoins, such as 5,5-dimethylhydantoin.

IV) Poly(S-glycidyl) compounds are typically bis-S-glycidyl derivatives which are derived from dithiols such as 1,2-ethanedithiol or bis(4-mercaptomethylphenyl) ether.

V) Exemplary of epoxy resins containing a radical of formula I, wherein $R_1$ and $R_3$ together are —CH$_2$—CH$_2$— and n is 0, are bis(2,3-epoxycyclopentyl) ether, 2,3-epoxycyclopentylglycidyl ether or 1,2-bis(2,3-epoxycyclopentyloxy) ethane. An epoxy resin containing a radical of formula I, wherein $R_1$ and $R_3$ together are —$CH_2$—$CH_2$— and n is 1, is for example 3,4-epoxy-6-methylcyclohexyl-3',4'-epoxy-6'-methylcyclohexanecarboxylate.

It is also possible, however, to use epoxy resins in which the 1,2-epoxy groups are attached to different hetero atoms or functional groups. These compounds comprise, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Liquid prereacted adducts of such epoxy resins with hardeners for epoxy resins are also suitable.

If desired, a mixture of epoxy resins can be used in the compositions of the invention.

Particularly preferred epoxy resins are polyglycidyl ethers of bisphenols, such as 2,2-bis(4-hydroxyphenyl)propane or bis(4-hydroxyphenyl)methane, or of the aforementioned aliphatic polyols, preferably 1,1,1-trimethylolpropane and bis(trimethylol)propane. Preferred epoxy resins are also the diglycidyl esters of the aforementioned dicarboxylic acids, preferably hexahydrophthalic acid and of the triglycidyl esters of trimellitic acid. The most particularly preferred cycloolefinic epoxy resin is 3,4-epoxy-6-methylcyclohexyl-3',4'-epoxy-6'-methylcyclohexanecarboxylate.

The solid colloidal condensation polymers of urea or melamine and formaldehyde having a pore volume greater than 1 cm3/g and a specific surface area greater than 5 $m^2/g$, which are used in the compositions of this invention, and the preparation thereof, are described in Makromol. Chem. 120, 68 (1968) and in Makromol. Chem. 149, 1 (1971).

Preferred condensation polymers are those having a pore volume greater than 2 cm3/g.

Urea/formaldehyde condensation polymer are especially preferred.

Methods of determining the pore volume and the specific surface area are known to the skilled person. Thus, for example, the pore volume can be determined by mercury porosimetry. The specific surface area can be measured, for example, by modified BET adsorption of nitrogen by the method of Haul and Dümbgen (Chem.-Ing.-Techn. 35, 586 (1963)).

Preferred compositions are those in which the weight ratio of component A to component B is 3.5–0.6:1.

Particularly preferred compositions are those in which the weight ratio of component A to component B is 1.5–0.8:1.

The compositions of the invention are prepared by injecting, spraying or adding dropwise component A to the fluidised or stirred component B. Preferably component A is added in a relative amount such that the softening temperature of the compositions remains above 100° C.

If component A has too high a viscosity for the above addition methods, then it can be diluted with a suitable solvent which is removed during addition, preferably under vacuum. Thus, for example, epoxy resins having a viscosity greater than 10 Pa.s can be dissolved in aliphatic esters, aliphatic ketones, aromatic hydrocarbons, chlorinated hydrocarbons which have a boiling point below 150° C., or in epichlorohydrin as obtained in the synthesis of the epoxy resin.

It was not to be expected that the practice of this invention would result in flee-flowing, non-tacky and non-aggregating powders which permit the use of intrinsically liquid epoxy resins, for example in powder coating and compression moulding technology, or in the use of the novel compositions as adhesives and casting resins.

To obtain cured products, the compositions of this invention can be mixed with suitable hardeners which are known to the skilled person, and cured in the temperature range from 100°–250° C.

The invention therefore also relates to a process for the preparation of cured products, which comprises the use of the novel compositions.

The invention further relates to the use of the novel compositions for surface protection.

Some preferred embodiments of the invention are described in the following Examples.

I. Preparation of the solid epoxy resins

EXAMPLE 1

30 g of a urea/formaldehyde condensation polymer (Pergopak® M 2; ex Maninswerk) predried at 120° C. are stirred at 135 rpm in a IKA RW-20 laboratory reactor, supplied by Jahnke & Kunkel. Then 34.85 g (30 ml) of a tetraglycidyl ether of bis(trimethylol)propane (epoxy value 6.60 eq/kg; viscosity 590 mPa.s at 25 ° C.) are added dropwise to this fluidised powder over 10 minutes, giving 64.85 g of a free-flowing powder which has an epoxy value of 3.70 eq/kg and a softening point of 195° C. (measured on a Kofler bench).

EXAMPLE 2

In the same apparatus as in Example 1, 30 g of Pergopak® M 2 are mixed with 34.85 g of trimethylolpropane triglycidyl ether (epoxy value 8.25 eq/kg; viscosity 55 mPa.s at 25 ° C.), giving 64.85 g of a free-flowing powder which has an epoxy value of 4.50 eq/kg and a softening point of 185° C. (measured on a Kofler bench).

EXAMPLE 3

As in Example 1, 30 g of Pergopak® M are mixed with 30 g of a cycloolefinic epoxy resin (epoxy value 7.13 eq/kg; viscosity 365 mPa.s at 25 ° C.), giving 60 g of a free-flowing powder which has an epoxy value of 3.60 eq/kg and a softening point of 190° C. (measured on a Kofler bench).

EXAMPLE 4

As in Example 1, 30 g of Pergopak® M are mixed with 30 g of a cycloaliphatic diglycidyl ester (epoxy value 5.91 eq/kg; viscosity 850 mPa.s at 25 ° C.), giving 60 g of a free-flowing powder which has an epoxy value of 2.93 eq/kg and a softening point of 190° C. (measured on a Kofler bench).

EXAMPLE 5

As in Example 1, 30 g of Pergopak® M are mixed with 30 g of an epoxy resin based on a sorbitol diglycidyl ether (epoxy value 5.80 eq/kg; viscosity 2.0 mPa.s at 25 ° C.), giving 60 g of a free-flowing powder which has an epoxy value of 2.62 eq/kg and a softening point of 190° C. (measured on a Kofler bench).

EXAMPLE 6

As in Example 1, 30 g of Pergopak® M are mixed with 30 g of an epoxy resin based on epoxidised soybean oil (epoxy value 4.3 eq/kg; viscosity 600 mPa.s at 25 ° C.), giving 60 g of a free-flowing powder which has an epoxy value of 2.15 eq/kg and a softening point of 190° C. (measured on a Kofler bench).

EXAMPLE 7

30 g of an epoxy resin based on bisphenol A (epoxy value 5.33 eq/kg; viscosity 7.5 mPa.s at 25 ° C.) are dissolved in 50 ml of 2-butanon. This solution is fed at 40° C. and 2400 Pa into a rotary evaporator containing 30 g of Pergopak® M and the mixture is kept for 1 hour at 40° C. and 2400 Pa, giving 60 g of a free-flowing powder which has an epoxy value of 2.56 eq/kg and a softening point of 190° C. (measured on a Kofler bench).

EXAMPLE 8

The procedure of Example 7 is repeated, adding to 30 g of Pergopak® M a solution of 30 g of the tetraglycidyl ether of 2,2',6,6'-tetramethylolcyclohexanol (prepared according to Example 2 of EP-A 135 477) in 50 ml of 2-butanone, giving 60 g of a free-flowing powder which has an epoxy value of 3.34 eq/kg and a softening point of 180° C. (measured on a Kofler bench).

EXAMPLE 9

In the same apparatus as in Example 1, 25.7 g of a colloidal reelamine/formaldehyde polymer (spec. surface area 253 m²/g) are mixed with 34.4 g of a cycloolefinic epoxy resin (epoxy value 7.13 eq/kg; viscosity 365 mPa.s at 25 ° C.), giving 60 g of a free-flowing powder which has an epoxy value of 4.8 eq/kg and a softening point of 190° C. (measured on a Kofler bench).

EXAMPLE 10

The procedure of Example 7 is repeated, adding to 30 g of Pergopak® M a solution of 98 g of the triglycidyl ester of trimellitic acid (prepared according to Example 15 of DE 1 643 777) in 1000 ml of ethyl acetate, giving 128 g of a free-flowing powder which has an epoxy value of 4.42 eq/kg and a softening point of 200° C. (measured on a Kofler bench).

II. 1. Preparation of powder coating compositions

Components:

Powders according to Examples 1, 3, 5, 7, 8 and 10.

solid, saturated, carboxyl-terminated polyester (Uralac® P 2400, ex Scado, acid value: 0.6 eq/kg; Uralac® P 3400, ex Scado, acid value: 0.6 eq/kg; Arakote®, ex Ciba-Geigy, acid value: 1.34 eq/kg).

Accelerator: mixture of 12.5 parts by weight of alkyltrimethylammonium bromide (Morpan® CHSA, ex ABM Chemicals) and 87.5 parts by weight of a solid, saturated, carboxyl-terminated polyester resin (Neoxit® TPC 83, ex Savid).

The components (q.v. Table 1) are milled together for 30 seconds in a free-falling mixer. The powder composition is then applied to a cleansed aluminium sheet and cured for 30–60 minutes at 180° C. The film so obtained has a thickness of 40–60 μm.

II.2. Preparation of casting resins 52 g of a powder according to Example 4, 66.1 g of a cycloolefinic epoxy resin (epoxy value 7.13 eq/kg; viscosity 365 mPa.s at 25 ° C.), 81.9 g of a hardener based on methylnadic anhydride and 0.2 g of an accelerator based on 1-methylimidazole are mixed, and the mixture is poured into steel moulds [(150×150×4) mm] and cured for 2 hours at 120° C., 2 hours at 150° C. and 2 hours at 180° C. White sheets are obtained.

III.3. Preparation of bonds

Anticorodal sheets are bonded with the casting resin described in II.2 and cured as in II.2.

III. Test of the technical properties

The technical properties of the powder coating compositions are listed in Table 2.

The technical properties of the castings are listed in Table 3.

The lap shear strength of the bonds is determined according to DIN 53 282. An average value of 12.6 N/mm² is obtained from 5 samples.

TABLE 1

| Formulation | A | B | C | D | E | F |
|---|---|---|---|---|---|---|
| powder (of Ex. 1) | 2.00 | | | | | |
| powder (of Ex. 3) | | 3.06 | | | | |
| powder (of Ex. 5) | | | 2.04 | | | |
| powder (of Ex. 7) | | | | 2.08 | | |
| powder (of Ex. 8) | | | | | 3.29 | |
| powder (of Ex. 10) | | | | | | 1.20 |
| Uralac P 2400 | . . | . . | . . | . . | . . | 8.80 |
| Uralac P 3400 | 12.10 | . . | 7.96 | 7.92 | . . | . . |
| Arakote 3003 | . . | 7.46 | . . | . . | 7.46 | . . |
| accelerator | 0.28 | . . | . . | 0.30 | . . | . . |

TABLE 2

| Properties | Powder coating composition | | | | | |
|---|---|---|---|---|---|---|
| | A | B | C | D | E | F |
| gel time (s) | 205 | 50 | 470 | 260 | 34 | 188 |
| curing (180° C., min) | 45 | 30 | 60 | 30 | 30 | 30 |
| impact strength (cm · kg) | 180 | 150 | 180 | 180 | 180 | 180 |
| Erichsen indentation (DIN 53156) | 10 | 9.6 | 9.4 | 9.6 | 10 | 10 |
| acetone test (rating) | 3 4 | 3 | 3 | 4 | 3 | 3 |
| adhesion (cross cut, rating) | 0 | 0 | 0 | 0 | 0 | 0 |
| hardness according to König (s) | 213 | 193 | 188 | 182 | 78 | 213 |

TABLE 3

| Properties | |
|---|---|
| impact strength (DIN 53453) | (11.48 ± 1.18) kJ/m² |
| flexural strength (DIN 53452) | (81 ± 6) N/mm² |
| temp. of deflection under load (ISO 75) | 165° C. |
| spec. resistance (DIN 53482) | $2.3 \cdot 10^{16}$ Ω · cm |
| surface resistance (IEC 167) | $9.3 \cdot 10^{12}$ Ω |
| water absorption after 4 d (25° C.) | 0.92% |
| water absorption after 1 h (100° C.) | 0.5% |

What is claimed is:

1. A non-aggregating, free-flowing powdery compsoititon comprising

A) a liquid or semi-solid epoxy resin and

B) a solid colloidal condensation polymer of urea or melamine and formaldehyde having a pore volume greater than 1 cm$^3$/g and a specific surface area greater than 5 m$^2$/g, wherein the liquid or semi-solid epoxy resin is converted into a powder with the aid of the colloidal condensation polymer.

2. A composition according to claim 1, wherein component A is an epoxy resin having a softening point below 40° C.

3. A composition according to claim 1, wherein component B has a pore volume greater than 2 cm$^3$/g.

4. A composition according to claim 1, wherein component B is a urea/formaldehyde polymer.

5. A composition according to claim 1, wherein the weight ratio of component A to component B is 3.5–0.6:1.

6. A composition according to claim 1, wherein the weight ratio of component A to component B is 1.5–0.8:1.

7. A process for the preparation of cured products, which comprises curing of a composition as claimed in claim 1.

* * * * *